(12) United States Patent
Guyer

(10) Patent No.: US 7,686,878 B2
(45) Date of Patent: Mar. 30, 2010

(54) COATING COMPOSITION CONTAINING A LOW VOC-PRODUCING SILANE

(75) Inventor: Kendall L. Guyer, Carmel, NY (US)

(73) Assignee: Momentive Performance Materials, Inc., Albany, NY (US)

( * ) Notice: Subject to any disclaimer, the term of this patent is extended or adjusted under 35 U.S.C. 154(b) by 782 days.

(21) Appl. No.: 11/295,083

(22) Filed: Dec. 6, 2005

(65) Prior Publication Data
US 2006/0205907 A1 Sep. 14, 2006

Related U.S. Application Data

(60) Provisional application No. 60/660,220, filed on Mar. 10, 2005.

(51) Int. Cl.
*C07F 7/08* (2006.01)
*C07F 7/10* (2006.01)

(52) U.S. Cl. .............. 106/287.11; 106/287.13; 106/287.15; 106/287.16; 556/446; 556/442; 556/464; 556/407; 556/429; 556/431; 556/423; 556/424; 556/414; 556/415; 556/416; 556/417; 556/419; 556/420

(58) Field of Classification Search ............. 556/435, 556/407, 442, 464; 16/287.11, 287.13, 287.15, 16/287.16
See application file for complete search history.

(56) References Cited

U.S. PATENT DOCUMENTS

| | | | | |
|---|---|---|---|---|
| 3,065,254 A | * | 11/1962 | Silva | 556/443 |
| 3,576,025 A | * | 4/1971 | Frye | 556/442 |
| 4,511,728 A | * | 4/1985 | Kreuzer et al. | 556/419 |
| 4,840,983 A | * | 6/1989 | Vincent | 524/265 |
| 4,842,766 A | * | 6/1989 | Blehm et al. | 516/23 |
| 4,990,552 A | * | 2/1991 | Mori et al. | 524/176 |
| 5,359,104 A | * | 10/1994 | Higgs et al. | 556/406 |
| 5,376,715 A | * | 12/1994 | Fennhoff et al. | 524/265 |
| 5,552,476 A | * | 9/1996 | Halling | 524/837 |
| 5,686,523 A | | 11/1997 | Chen et al. | |
| 6,037,008 A | | 3/2000 | Huang et al. | |
| 6,294,620 B1 | * | 9/2001 | Huang et al. | 525/452 |
| 2006/0036034 A1 | * | 2/2006 | Chaves et al. | 525/100 |
| 2006/0177657 A1 | * | 8/2006 | Weller | 428/364 |

\* cited by examiner

*Primary Examiner*—Margaret G Moore
(74) *Attorney, Agent, or Firm*—Dominick G. Vicari; Joseph S. Ostroff

(57) ABSTRACT

A coating composition is provided which includes an adhesion promoter or a crosslinker silane which, upon hydrolysis, of its hydrolyzable sites, produces a reduced amount of volatile organic compound compared to that produced by the hydrolysis of a silane possessing an equivalent number of hydrolyzable sites all of which are hydrolyzable alkoxy groups.

27 Claims, No Drawings

COATING COMPOSITION CONTAINING A LOW VOC-PRODUCING SILANE

CROSS-REFERENCE TO RELATED APPLICATION

The present invention claims priority to U.S. provisional application Ser. No. 60/660,220 filed on Mar. 10, 2005, the contents of which are incorporated by reference herein.

BACKGROUND OF THE INVENTION

Architectural, industrial maintenance, decorative, protective or other coatings are commonly made or used with organic solvents that evaporate during the application of the coating. These solvents can escape into the atmosphere as volatile organic compounds (VOCs). VOCs may be a health, a safety or an environmental hazard and may need to be mitigated or removed from coating systems. Waterborne coatings, though significantly lower in VOCs than solventborne coatings, may also have appreciable VOC levels from the use of coalescing solvents or other agents in their composition.

It is possible to use organofunctional silanes in waterborne, solventborne and other coating systems to improve the properties (adhesion, solvent resistance, weatherability, etc.) of the coating. The use of organofunctional silanes as crosslinkers or adhesion promoters in these systems can contribute to VOCs through the action of water on a hydrolyzable silane. Typical commercial organofunctional silanes are supplied as silane esters and therefore release alcohols upon hydrolysis. These alcohols, such as methanol, ethanol, etc., are typically VOCs.

The preparation of hydrolyzable organofunctional silanes with leaving groups that are not volatile (or much less volatile than alcohols) is desirable to lower or eliminate VOCs in coating compositions containing organofunctional silanes. The prior art does not address the use of silane containing organofunctional groups with reduced VOCs. Accordingly, there exists a need for improved organofunctional silane adhesion promoters and/or crosslinkers to create coatings that have lower VOCs emissions.

BRIEF DESCRIPTION OF THE INVENTION

In accordance with the present invention, a coating composition is provided which comprises an adhesion promoting amount or crosslinking effective amount of a silane which, upon hydrolysis, of its hydrolyzable sites, produces a reduced amount of volatile organic compounds compared to that produced by the hydrolysis of a silane possessing an equivalent number, per mole, of hydrolyzable sites all of which are hydrolyzable alkoxy groups.

It is to be understood that the present invention is not limited to waterborne coatings. It includes uses of low VOC silanes for any type of coating or surface treatment for architectural, industrial maintenance, decorative, protective or other coatings. Examples of coating systems are automotive clearcoats, powder coatings, hardcoats such as those used in the production of plastic automotive headlamp lenses, silane-based metal conversion coatings and radiation cured coatings.

The expression "volatile organic compound" (VOC) as used herein shall be understood to apply to and designate substantially pure organic compounds that are volatile per the United States Environmental Protection Agency (EPA) Method 24 and/or do not meet specific criteria established for countries within Europe with respect to vapor pressure or boiling point or are cited as VOCs in European Union Directive 2004/42/EC. Copies of EPA Method 24 and European Union Directive 2004/42/EC are attached hereto and constitute an integral part of this application. Specific examples of such VOCs include methanol, ethanol, propanol, isopropanol, acetoxysilanes, etc.

The subject invention also includes a waterborne coating composition which includes water, an emulsion-forming amount of at least one emulsifier, and an adhesion-promoting or crosslinker-promoting effective amount of a silane which, upon hydrolysis, of its hydrolyzable sites, produces a reduced amount of volatile organic compounds compared to that produced by the hydrolysis of a silane possessing an equivalent number, per mole, of hydrolyzable sites all of which are hydrolyzable alkoxy groups.

Various other features, aspects and advantages of the present invention, will become more apparent with reference to the following description and appended claims.

DETAILED DESCRIPTION OF THE INVENTION

A coating composition is provided which comprises an adhesion promoting amount or crosslinking effective amount of a silane which, upon hydrolysis, of its hydrolyzable sites, produces a reduced amount of volatile organic compound compared to that produced by the hydrolysis of a silane possessing an equivalent number of hydrolyzable sites all of which are hydrolyzable alkoxy groups.

Silanes suitable for the present invention include silanes of the general formula:

$$[Y[\text{-}G(\text{---}SiX_u Z^b_v Z^c_w)_s]_r]_n \qquad \text{(Formula 1)}$$

wherein each occurrence of G is independently a polyvalent group derived from the substitution of one or more hydrogen atoms of an alkyl, alkenyl, aryl or aralkyl group, or a group obtained by removal of one or more hydrogen atoms of a heterocarbon, with G containing from about 1 to about 30 carbon atoms; each occurrence of X is independently —Cl, —Br, $R^1O$—, $R^1C(=O)O$—, hydroxycarboxylicacids, $R^1R^2C=NO$—, $R^1R^2NO$— or $R^1R^2N$—, —$R^1$, —$(OSiR^1R^2)_t(OSi\ R^1R^2R^3)$, and —$O(R^{10}CR^{11})_f(OH$, wherein each occurrence of $R^1$, $R^2$, $R^3$, $R^{10}$, and $R^{11}$ is independently R; each occurrence of $Z^b$ is independently selected from the group consisting of (—O—)$_{0.5}$, [—O($R^{10}CR^{11}$)$_f$O—]$_{0.5}$, [—$NR^4$-$L^1$—$NR^5$—]$_{0.5}$, [—OC(=O)$R^{10}CR^{11}$C(=O)O—]$_{0.5}$ except succinic, maleic or phthalic acid, an alkanolamine or an acetylenic glycol where these groups form bridging bonds between silicon atom centers, wherein each occurrence of $R^{10}$ and $R^{11}$ is independently R and each occurrence of $L^1$ is independently G; each occurrence of $Z^C$ is independently selected from the group consisting of —O($R^{10}CR^{11}$)$_f$O—, —$NR^4$-$L^1$—$NR^5$—, —OC(=O)$R^{10}CR^{11}$C(=O)O—except succinic, maleic or phthalic acid, an alkanolamine or an acetylenic glycol where these groups form cyclic bonds with a silicon atom center, wherein each occurrence of $R^{10}$ and $R^{11}$ is independently R and each occurrence of $L^1$ is independently G; each occurrence of R is hydrogen, straight alkyl, cyclic alkyl, branched alkyl, alkenyl, aryl, aralkyl, an ether, polyether, or a group obtained by removal of one or more hydrogen atoms of a heterocarbon; each occurrence of R contains from 1 to about 20 carbon atoms; each occurrence of the subscript f is an integer of from 1 to about 15; each occurrence of n is an integer of from 1 to about 100, with the proviso that when n is greater than 1; v is greater than 0 and all of the valences for $Z^b$ have a silicon atom bonded to them; each occurrence of the subscript u is an integer of from 0 to about 3; each occurrence of the subscript v is an integer of from 0 to about 3; each occurrence of the subscript w is an integer from 0 to about 1, with the proviso that u+v+2w=3; each occurrence of the subscript r is an integer of from 1 to about 6; each occurrence of the subscript t is an integer of from 0 to about 50; each occurrence of the subscript s is an integer of from 1 to about 6; each occurrence of Y is an organofunctional group of valence r; and at least one cyclic and bridging organofunctional silane comprising the cyclic and bridging organofunctional silane composition containing at least one occurrence of $Z^b$ or $Z^c$.

In the Silane of Formula 1, group Y herein includes univalent organofunctional groups (r=1), divalent organofunctional groups (r=2), trivalent organofunctional groups (r=3), tetravalent organofunctional groups (r=4), as well as organofunctional groups of higher valency, herein referred to as polyvalent organofunctional groups. The term polyvalent organofunctional group herein shall be understood to include univalent, divalent, trivalent, and tetravalent organofunctional groups.

In another embodiment of the silane of Formula 1, $Z^b$ is independently $(-O-)_{0.5}$; $[-O(R^{10}CR^{11})_tO-]_{0.5}$; a diamine such as ethylenediamine to form a bridged silazane, $[-NR^4-L^1-NR^5-]^{0.5}$; an alkanolamine such as 2-aminoethanol; a dicarboxylic acid such as adipic acid, malonic acid, etc., to form bridged carboxysilanes, $[-OC(=O)R^{10}CR^{11}C(=O)O-]_{0.5}$ except succinic, maleic or phthalic acid; an acetylenic glycol including polyalkoxylated variants such as Surfynol® surfactants available from Air Products; or polyvinylalcohol.

Another embodiment of the present invention herein includes $Z^c$ is independently a diol-derived alkoxy group, $-O(R^{10}CR^{11})_tO-$; a diamine such as ethylenediamine to form a cyclic silazane, $-NR^4-L^1-NR^5-$; an alkanolamine such as 2-aminoethanol; a dicarboxylic acid such as adipic acid, malonic acid, etc., to form cyclic carboxysilanes, $-OC(=O)R^{10}CR^{11}C(=O)O-$ except succinic, maleic or phthalic acid; an acetylenic glycol including polyalkoxylated variants such as Surfynol® surfactants available from Air Products; or polyvinylalcohol.

Diol-derived organofunctional silanes in which the silanes contain cyclic and bridged alkoxy groups derived from hydrocarbon-based diols; cyclic and bridging organofunctional silane compositions; diamines such as ethylenediamine, $-NR^4-L^1-NR^5-$; alkanolamines such as 2-aminoethanol; dicarboxylic acids such as adipic acid or malonic acid, $-OC(=O)R^{10}CR^{11}C(=O)O-$ except succinic, maleic or phthalic acid; acetylenic glycols including polyalkoxylated variants such as Surfynol® surfactants available from Air Products; or polyhydroxy compounds such as polyvinylalcohol used to make silane ester described herein eliminate or greatly mitigate the release of alcohol during use or manufacturing in which a silane silicon reacts with a monomer or polymer.

Another embodiment of the present invention herein includes X is independently selected from the group consisting of —Cl, —Br, $R^1O-$, $R^1C(=O)O-$, hydroxyacids such as glycolic acid, $R^1R^2C=NO-$, $R^1R^2NO-$ or $R^1R^2N-$, $-R^1$, $-(OSiR^1R^2)_t(OSi R^1R^2R^3)$, $-O(R^{10}CR^{11})_tOH$ and $-O(R^{10}CR^{11})_tOCH_3$, wherein each occurrence of $R^1$, $R^2$, $R^3$, $R^{10}$ and $R^{11}$ is independently R, ester alcohols such as Texanol® available from Eastman Chemicals (2,2,4-Trimethyl-1,3-pentanediol monoisobutyrate) and other solvents that are not classified as VOCs per European Union Directive 2004/42/EC.

Another embodiment of the present invention herein includes univalent organofunctional groups such as mercapto and acyloxy groups such as acryloxy, methacryloxy and acetoxy. Another exemplary embodiment of the present invention herein includes univalent epoxys such as glycidoxy, $-O-CH_2-C_2H_3O$; epoxycyclohexylethyl, $-CH_2-CH_2-C_6H_9O$; epoxycyclohexyl, $-C_6H_9O$; epoxy, $-CR^6(-O-)CR^4R^5$. Another embodiment of the present invention herein includes univalent organofunctional groups such as vinyl, $-CH=CH_2$, allyl, $-C-CH=CH_2$, or methallyl, $-C-CH=CHCH_3$. Another embodiment of the present invention herein includes univalent organofunctional groups such as hydroxy, carbamate, $-NR^4C(=O)OR^5$; urethane, $-OC(=O)NR^4R^5$; thiocarbamate, $-NR^4C(=O)SR^5$; thiourethane, $-SC(=O)NR^4R^5$; thionocarbamate, $-NR^4C(=S)OR^5$; thionourethane, $-OC(=S)NR^4R^5$; dithiocarbamate, $-NR^4C(=S)SR^5$; and dithiourethane, $-SC(=S)NR^4R^5$. Another embodiment of the present invention herein includes univalent organofunctional groups such as maleimide; maleate and substituted maleate; fumurate and substituted fumurate; nitrile, CN; citraconimide. Another exemplary embodiment of the present invention herein includes univalent organofunctional groups such as cyanate, —OCN; isocyanate, $-N=C=O$; thiocyanate, —SCN; isothiocyanate, $-N=C=S$; and ether, $-OR^4$. Another embodiment of the present invention herein includes univalent organofunctional groups such as fluoro, —F; chloro, —Cl; bromo, —Br; iodo, —I; and thioether, $-SR^4$. Another embodiment of the present invention herein includes univalent organofunctional groups such as disulfide, $-S-SR^4$; trisulfide, $-S-S-SR^4$; tetrasulfide, $-S-S-S-SR^4$; pentasulfide, $-S-S-S-S-SR^4$; hexasulfide, $-S-S-S-S-S-SR^4$; and polysulfide, $-S_xR^4$. Another embodiment of the present invention herein includes univalent organofunctional groups such as xanthate, $-SC(=S)OR^4$; trithiocarbonate, $-SC(=S)SR^4$; dithiocarbonate, $-SC(=O)SR^4$; ureido, $-NR^4C(=O)NR^5R^6$; thionoureido (also better known as thioureido), $-NR^4C(=S)NR^5R^6$; amide, $R^4C(=O)NR^5-$ and $-C(=O)NR^4R^5-$; thionoamide (also better known as thioamide), $R^4C(=S)NR^4-$; univalent melamino; and, univalent cyanurato. Another embodiment of the present invention herein includes univalent organofunctional groups such as primary amino, $-NH_2$; secondary amino, $-NHR^4$; and tertiary amino, $-NR^4R^5$.univalent diamino, $-NR^4-L^1-NR^5R^6$; univalent triamino, $-NR^4-L^1(-NR^5R^6)_2$ and $-NR^4-L^1-NR^5-L^2-NR^6R^7$; and univalent tetraamino, $-NR^4-L^1(-NR^5R^6)_3$, $-NR^4-L^1-NR^5-L^2-NR^6-L^3-NR^7R^8$, and $-NR^4-L^1-N(-L^2NR^5R^6)_2$; wherein each occurrence of $L^1$, $L^2$, and $L^3$ is selected independently from the set of structures given above for G; each occurrence of $R^4$, $R^5$, $R^6$, $R^7$ and $R^8$ is independently given by one of the structures listed above for R; and each occurrence of the subscript, x, is independently given by x is 1 to 10.

Another embodiment of the present invention herein includes divalent organofunctional groups such as epoxy, $-(-)C(-O-)CR^4R^5$ and $-CR^5(-O-)CR^4-$. Another embodiment of the present invention herein includes divalent organofunctional groups such as carbamate, $-(-)NC(=O)OR^5$; urethane, $-OC(=O)NR^4-$; thiocarbamate, $-(-)NC(=O)SR^5$; thiourethane, $-SC(=O)NR^4-$; thionocarbamate, $-(-)NC(=S)OR^5$; thionourethane, $-OC(=S)NR^4-$; dithiocarbamate, $-(-)NC(=S)SR^5$; dithiourethane, $-SC(=S)NR^4-$; and ether, $-O-$. Another embodiment of the present invention herein includes divalent organofunctional groups such as maleate and substituted maleate; fumurate and substituted fumurate. Another embodiment of the present invention herein includes thioether, $-S-$; disulfide, $-S-S-$; trisulfide, $-S-S-S-$; tetrasulfide, $-S-S-S-S-$; pentasulfide, $-S-S-S-S-S-$; hexasulfide, —S—S—S—S—S—S—; and polysulfide, —S$_x$—. Another embodiment of the present invention herein includes divalent organofunctional groups such as xanthate, —SC(=S)O—; trithiocarbonate, —SC(=S)S—; dithiocarbonate, —SC(=O)S—; ureido, -(-) NC(=O)NR$^4$R$^5$ and —NR$^4$C(=O)NR$^5$—; thionoureido, also better known as thioureido, -(-)NC(=S)NR$^4$R$^5$ and —NR$^4$C(=S)NR$^5$—; amide, R$^4$C(=O)N(-)- and —C(=O)NR$^4$—; thionoamide, also better known as thioamide, R$^4$C(=S)N(-)-; divalent melamino; divalent cyanurato. Another embodiment of the present invention herein includes divalent organofunctional groups such as secondary amino, —NH—; tertiary amino, —NR$^4$—; divalent diamino, -(-)N-L$^1$—NR$^4$R$^5$ and —NR$^4$—L$^1$—NR$^5$—; divalent triamino, (-) NR$^4$)$_2$-L$^1$—NR$^5$R$^6$, -(-)N-L$^1$—NR$^5$—L$^2$—NR$^6$R$^7$, —NR$^4$—L$^1$—N(-)-L$^2$—NR$^5$R$^6$, and —NR$^4$—L$^1$—NR$^5$—L$^2$—NR$^6$—; and divalent tetraarino, -(-)N-L$^1$-(NR$^5$R$^6$)$_3$, (—NR$^4$)$_2$-L$^1$—(NR$^5$R$^6$)$_2$, -(-) N-L$^1$—NR$^4$—L$^2$—NR$^5$—L$^3$—NR$^6$R$^7$, —NR$^4$—L$^1$—N(-)-L$^2$—NR$^5$—L$^3$NR$^6$R$^7$, —NR$^4$—L$^1$—NR$^5$—L$^2$—N(-)-L$^3$—NR$^6$R$^7$, —NR$^4$—L$^1$—NR$^5$—L$^2$—NR$^6$—L$^3$—NR$^7$—, -(-)N-L$^1$—N(-L$^2$NR$^5$R$^6$)$_2$, and (—NR$^4$L$^1$-)$_2$N-L$^2$NR$^5$R$^6$; wherein each occurrence of L$^1$, L$^2$, and L$^3$ is selected independently from the set of structures given above for G; each occurrence of R$^4$, R$^5$, R$^6$, and R$^7$ is independently given by one of the structures listed above for R; and each occurrence of the subscript, x, is independently given by x is 1 to 10.

Another embodiment of the present invention herein includes trivalent organofunctional groups such as epoxy, -(-)C (—O—)CR$^4$—. Another embodiment of the present invention herein includes trivalent organofunctional groups such as hereincarbamate, -(-) NC(=O)O—; thiocarbamate, -(-) NC(=O)S—; thionocarbamate, -(-)NC(=S)O—; and dithiocarbamate, -(-)NC(=S)S—. ureido, -(-)NC(=O)NR$^4$—; thionoureido, also better known as thioureido, -(-)NC(=S)NR$^4$—; amide, —C(=O)N (-)-; thionoamide, also better known as thioamide, —C(=S)N(-)-; trivalent melamino; and trivalent cyanurato. Another embodiment of the present invention herein includes trivalent organofunctional groups such as tertiary amino, —N(-)-; trivalent diamino, -(-)N-L$^1$—NR$^4$—; trivalent triamino, (—NR$^4$)$_3$—L$^1$, (—NR$^4$)$_2$—L$^1$—NR$^5$—, -(-)N-L$^1$—N(-)-L$^2$—NR$^3$R$^4$, —NR$^4$—L$^1$—N(-)-L$^2$—NR$^5$—, and —(-)N—L$^1$—NR$^4$—L$^2$—NR$^5$—; and trivalent tetraamino, -(-)N-L$^1$—N(-)-L$^2$—NR$^5$—L$^3$—NR$^3$R$^4$, —NR$^4$—L$^1$—N (-)-L$^2$—N(-)—L$^3$—NR$^3$R$^4$, -(-)N-L$^1$—NR$^5$—L$^2$—N(-)-L$^3$—NR$^3$R$^4$, —NR$^4$—L$^1$—N(-)-L$^2$—NR$^3$—L$^3$—NR$^4$—, -(-)N-L$^1$—N(-L$^2$NR$^3$R$^4$)(-L$^2$NR$^5$—), and (—NR$^4$L$^1$-)$_3$N; wherein each occurrence of L$^1$, L$^2$, and L$^3$ is selected independently from the set of structures given above for G; and each occurrence of R$^4$, R$^5$, and R$^6$ is independently given by one of the structures listed above for R.

Another embodiment of the present invention herein includes tetravalent organofunctional group such as epoxy, -(-)C (—O—)C(-)-; Another embodiment of the present invention herein includes tetravalent organofunctional groups such as ureido, -(-)NC(=O)N(-)-; thionoureido (also better known as thioureido), -(-)NC(=S)N(-)-; and tetravalent melamino. Another embodiment of the present invention herein includes tetravalent organofunctional groups tetravalent diamino, -(-)N—L$^1$—N(-)-; tetravalent triamino, (—NR$^4$)$_4$—L$^1$, (—NR$^4$)$_2$—L$^1$—N(-)-,-(-)N-L$^1$—N(-)-L$^2$—NR$^3$—, and -(-)N-L$^1$—NR$^4$—L$^2$(-)-; and tetravalent tetraamino, -(-)N-L$^1$—N(-)-L$^2$—N (-)-L$^3$—NR$^4$R$^3$, —NR$^4$—L$^1$—N(-)-L$^2$—N(-)-L$^3$—NR$^3$—, -(-)N-L$^1$—NR$^4$—L$^2$—NR$^3$—L$^3$—N(-)-, and -(-)N-L$^1$—N(-L$^2$NR$^3$—)$_2$; wherein each occurrence of L$^1$, L$^2$, and L$^3$ is selected independently from the set of structures given above for G; and each occurrence of R$^4$ and R$^5$ is independently given by one of the structures listed above for R.

Another embodiment of the present invention herein includes polyvalent organofunctional groups such as, but is not limited to, polyvalent hydrocarbon groups; pentavalent melamino, (—NR$^3$)(—N—)$_2$C$_3$N$_3$; hexavalent melamino, (—N—)$_3$C$_3$N$_3$; pentavalent triamino, -(-)N-L$^1$—N(-)-L$^2$—N(-)-; pentavalent tetraamino, -(-)N-L$^1$—N(-)-L$^2$—N(-)-L$^3$—NR$^3$—, -(-)N-L$^1$—NR$^3$—L$^2$—N(-)-L$^3$—N(-)-, and [-(-)N-L$^1$-]$_2$N-L$^2$NR$^3$—; and hexavalent tetraamino, -(-)N-L$^1$—N(-)-L$^2$—N(-)-L$^3$—N(-)- and [-(-)N-L$^1$-]$_3$N; wherein each occurrence of L$^1$, L$^2$, and L$^3$ is selected independently from the set of structures given above for G; and each occurrence of R$^4$ is independently given by one of the structures listed above for R.

As used herein, diol, hydrocarbon diol, and difunctional alcohol refer to a compound of structural Formula 2:

HO(R$^{10}$CR$^{11}$)$_f$OH    (Formula 2)

wherein f, R$^{10}$, and R$^{11}$ are as defined above. These compounds include represent hydrocarbons or heterocarbons in which two hydrogen atoms are replaced with OH in accordance with the structures drawn in Formula 2. As used herein, dialkoxy and difunctional alkoxy refer to a hydrocarbon diol, as defined herein, in which the hydrogen atoms of the two OH groups have been removed to a give divalent radical, and whose structure is given by Formula 3:

—O(R$^{10}$CR$^{11}$)$_f$O—    (Formula 3)

wherein f R$^{10}$, and R$^{11}$ are as defined above. As used herein, cyclic refers to a silane or group in which cyclization is about silicon, by two oxygen atoms each attached to a common divalent hydrocarbon or heterocarbon group, such as is commonly found in diols. Cyclic groups; diol—derived alkoxy groups, —O(R$^{10}$CR$^{11}$)$_f$O—; diamines such as ethylenediamine, —NR$^4$—L$^1$—NR$^5$—; alkanolamines such as 2aminoethanol; dicarboxylic acids such as adipic acid or malonic acid, —OC(=O)R$^{10}$CR$^{11}$C(=O)O—except succinic, maleic or phthalic acid; acetylenic glycols including polyalkoxylated variants such as Surfynol® surfactants available from Air Products; and polyvinylalcohol used to make silane esters described herein are represented by Z$^c$. As used herein, bridging refers to a silane or group in which two different silicon atoms are each bound to one oxygen atom, which is in turn bound to a common divalent hydrocarbon or heterocarbon group as defined herein, such as is commonly found in diols. Bridging groups; diamines such as ethylenediamine, —NR$^4$—L$^1$—NR$^5$—; alkanolamines such as 2-aminoethanol; dicarboxylic acids such as adipic acid or malonic acid, —OC(=O)R$^{10}$CR$^{11}$C(=O)O—except succinic, maleic or phthalic acid; acetylenic glycols including polyalkoxylated variants such as Surfynol® surfactants available from Air Products; or polyvinylalcohol used to make silane esters described herein are represented by Z$^b$. As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic dialkoxy group, a silane with a silicon atom not bound to a cyclic dialkoxy group and bound to bridging group(s) only, a silane with silicon bound to both one end of a bridging group and both ends of a cyclic dialkoxy group, a silane with a silicon atom not bound at all to a dialkoxy group (as long as at least one other silicon atom in the same molecule is bound to at least one cyclic or bridging group), etc. As used herein, hydrocarbon based diols refer to diols, which contain two OH groups on a hydrocarbon or heterocarbon structure. The term, "hydrocarbon based diol", refers to the fact that the backbone between the two oxygen atoms consists entirely of carbon atoms, carbon-carbon bonds between the carbon atoms, and two carbon—oxygen bonds encompassing the alkoxy ends. The heterocarbons in the structure occur pendent to the carbon backbone.

The structures given by Formula 2 will herein be referred to as the appropriate diol, in a few specific cases, glycol is the more commonly used term, prefixed by the particular hydrocarbon or heterocarbon group associated with the two OH groups. Examples include neopentylglycol, 1,3-butanediol, and 2-methyl-2,4-pentanediol. The groups whose structures are given by Formula 3 will herein be referred to as the appropriate dialkoxy, prefixed by the particular hydrocarbon or heterocarbon group associated with the two OH groups. Thus, for example, the diols, neopentylglycol, 1,3-butanediol, and 2-methyl-2,4pentanediol correspond herein to the dialkoxy groups, neopentylglycoxy, 1,3-butanedialkoxy, and 2-methyl-2,4-pentanedialkoxy, respectively.

The cyclic and bridging organofunctional silanes used herein, in which the silane is derived from a diol, commonly referred to as a glycol, are correspondingly glycoxysilane. Also, the cyclic and bridging organofunctional dialkoxy silanes used herein, in which the silane is derived from a diol, commonly referred to as a diol, are correspondingly named dialkoxysilane.

As used herein, the notations, $(-O-)_{0.5}$ and $[-O(R^{10}CR^{11})_fO-]_{0.5}$, refer to one half of a siloxane group, Si—O—Si, and one half of a bridging group, respectively. These notations are used in conjunction with a silicon atom and they are taken herein to mean one half of an oxygen atom, namely, the half bound to the particular silicon atom, or to one half of a dialkoxy group, namely, the half bound to the particular silicon atom, respectively. It is understood that the other half of the oxygen atom or dialkoxy group and its bond to silicon occurs somewhere else in the overall molecular structure being described. Thus, the $(-O-)_{0.5}$ siloxane groups and the $[-O(R^{10}CR^{11})_fO-]_{0.5}$ dialkoxy groups mediate the chemical bonds that hold two separate silicon atoms together, whether these two silicon atoms occur intermolecularly or intramolecularly. In the case of $[-O(R^{10}CR^{11})_fO-]_{0.5}$, if the hydrocarbon group, $(R^{10}CR^{11})_f$ is unsymmetrical, either end of $[-O(R^{10}CR^{11})_fO-]_{0.5}$ may be bound to either of the two silicon atoms required to complete the structures given in Formula 1.

As used herein, alkyl includes straight, branched and cyclic alkyl groups; alkenyl includes any straight, branched, or cyclic alkenyl group containing one or more carbon-carbon double bonds, where the point of substitution can be either at a carbon-carbon double bond or elsewhere in the group. Also, alkynyl includes any straight, branched, or cyclic alkynyl group containing one or more carbon-carbon triple bonds and optionally also one or more carbon-carbon double bonds as well, where the point of substitution can be either at a carbon—carbon triple bond, a carbon-carbon double bond, or elsewhere in the group. Specific examples of alkyls include methyl, ethyl, propyl, and isobutyl. Specific examples of alkenes include vinyl, progeny, ally, lethally, ethylidenyl norbornane, ethylidene norbornyl, ethylidenyl norbornene and ethylidene norbornenyl. Specific examples of alkynyls include acetylenyl, propargyl and methylacetylenyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cyclic alkyl, cyclic alkenyl and cyclic alkynyl also include bicyclic, tricyclic, and higher cyclic structures, as well as the aforementioned cyclic structures further substituted with alkyl, alkenyl and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

As used herein, the term, heterocarbon, refers to any hydrocarbon structure in which the carbon-carbon bonding backbone is interrupted by bonding to atoms of nitrogen and/or oxygen; or in which the carbon-carbon bonding backbone is interrupted by bonding to groups of atoms containing nitrogen and/or oxygen, such as cyanurate ($C_3N_3O_3$). Thus, heterocarbons include, but are not limited to branched, straight-chain, cyclic and/or polycyclic aliphatic hydrocarbons, optionally containing ether functionality via oxygen atoms each of which is bound to two separate carbon atoms, tertiary amine functionality via nitrogen atoms each of which is bound to three separate carbon atoms, melamino groups and/or cyanurate groups; aromatic hydrocarbons; and arenes derived by substitution of the aforementioned aromatics with branched or straight chain alkyl, alkenyl, alkynyl, aryl and/or aralkyl groups.

Representative examples of G include $-(CH_2)_m-$ wherein m is 1 to 12; diethylene cyclohexane; 1,2,4-triethylene cyclohexane; diethylene benzene; phenylene; $-(CH_2)_p-$ wherein p is 1 to 20, which represent the terminal straight-chain alkyls further substituted terminally at the other end, such as $-CH_2-$, $-CH_2CH_2-$, $-CH_2CH_2CH_2-$, and $-CH_2CH_2CH_2CH_2CH_2CH_2CH_2CH_2-$, and their beta—substituted analogs, such as $-CH_2(CH_2)_qCH(CH_3)-$, where q is zero to 17; $-CH_2CH_2C(CH_3)_2CH_2-$; the structure derivable from methallyl chloride, $-CH_2CH(CH_3)CH_2-$; any of the structures derivable from divinylbenzene, such as $-CH_2CH_2(C_6H_4)CH_2CH_2-$ and $-CH_2CH_2(C_6H_4)CH(CH_3)-$, where the notation $C_6H_4$ denotes a disubstituted benzene ring; any of the structures derivable from dipropenylbenzene, such as $-CH_2CH(CH_3)(C_6H_4)CH(CH_3)CH_2-$, where the notation $C_6H_4$ denotes a disubstituted benzene ring; any of the structures derivable from butadiene, such as $-CH_2CH_2CH_2CH_2-$, $-CH_2CH_2CH(CH_3)-$, and $-CH_2CH(CH_2CH_3)-$; any of the structures derivable from piperylene, such as $-CH_2CH_2CH_2CH(CH_3)-$, $-CH_2CH_2CH(CH_2CH_3)-$, and $-CH_2CH(CH_2CH_3)-$; any of the structures derivable from isoprene, such as $-CH_2CH(CH_3)CH_2CH_2-$, $-CH_2CH(CH_3)CH(CH_3)-$, $-CH_2C(CH_3)(CH_2CH_3)-$, $-CH_2CH_2CH(CH_3)CH_2-$, $-CH_2CH_2C(CH_3)_2-$ and $-CH_2CH[CH(CH_3)_2]-$; any of the isomers of $-CH_2CH_2$-norbornyl-, $-CH_2CH_2$-cyclohexyl-; any of the diradicals obtainable from norbornane, cyclohexane, cyclopentane, tetrahydrodicyclopentadiene, or cyclododecene by loss of two hydrogen atoms; the structures derivable from limonene, $-CH_2CH(4$-methyl-1-$C_6H_9-)CH_3$, where the notation $C_6H_9$ denotes isomers of the trisubstituted cyclohexane ring lacking substitution in the 2 position; any of the monovinyl-containing structures derivable from trivinylcyclohexane, such as $-CH_2CH_2(vinylC_6H_9)CH_2CH_2-$ and $-CH_2CH_2$ (vinylC$_6$H$_9$)CH(CH$_3$)—, where the notation C$_6$H$_9$ denotes any isomer of the trisubstituted cyclohexane ring; any of the monounsaturated structures derivable from myrcene containing a trisubstituted C=C, such as —CH$_2$CH[CH$_2$CH$_2$CH=C(CH$_3$)$_2$]CH$_2$CH$_2$—, —CH$_2$CH[CH$_2$CH$_2$CH=C(CH$_3$)$_2$]CH(CH$_3$)—, —CH$_2$C[CH$_2$CH$_2$CH=C(CH$_3$)$_2$](CH$_2$CH$_3$)—, —CH$_2$CH$_2$CH[CH$_2$CH$_2$CH=C(CH$_3$)$_2$]CH$_2$—, —CH$_2$CH$_2$(C—)(CH$_3$)[CH$_2$CH$_2$CH=C(CH$_3$)$_2$], and —CH$_2$CH[CH(CH$_3$)[CH$_2$CH$_2$CH=C(CH$_3$)$_2$]]—; and any of the monounsaturated structures derivable from myrcene lacking a trisubstituted C=C, such as —CH$_2$CH(CH=CH$_2$)CH$_2$CH$_2$CH$_2$C(CH$_3$)$_2$—, —CH$_2$CH(CH=CH$_2$)CH$_2$CH$_2$CH[CH(CH$_3$)$_2$]—, —CH$_2$C(=CH—CH$_3$)CH$_2$CH$_2$CH$_2$C(CH$_3$)$_2$—, —CH$_2$C(=CH—CH$_3$)CH$_2$CH$_2$CH[CH(CH$_3$)$_2$]—, —CH$_2$CH$_2$C(=CH$_2$)CH$_2$CH$_2$CH$_2$C(CH$_3$)$_2$—, —CH$_2$CH$_2$C(=CH$_2$)CH$_2$CH$_2$CH[CH(CH$_3$)$_2$]—, —CH$_2$CH=C(CH$_3$)$_2$CH$_2$CH$_2$CH$_2$C(CH$_3$)$_2$—, and —CH$_2$CH=C(CH$_3$)$_2$CH$_2$CH$_2$CH[CH(CH$_3$)$_2$].

Representative examples of R groups are H, branched and straight-chain alkyls of 1 to 20 carbon atoms such as methyl, ethyl, propyl, isopropyl, butyl, octenyl, cyclohexyl, phenyl, benzyl, tolyl, allyl, methoxyethyl, ethoxyethyl dimethylaminoethyl, cyanoethyl, and the like. In another embodiment, representative R$^{10}$ and R$^{11}$ groups are hydrogen, methyl, and ethyl, of which hydrogen and methyl are most preferred. In yet another embodiment, representative R$^1$ and R$^2$ groups can be hydrogen, methyl, ethyl, propyl. In still another embodiment, representative examples of R$^3$, R$^4$, R$^5$, R$^6$, R$^7$, and R$^8$ groups can be H$_2$, C$_1$ to C$_4$ straight chain or branched alkyls such as methyl, ethyl, propyl, isopropyl, butyl, isobutyl, pentyl, hexyl, heptyl, octyl, and aryl such as phenyl, benzyl, etc.

Specific examples of X are methoxy, ethoxy, propoxy, isopropoxy, isobutoxy, acetoxy, methoxyethoxy, and oximato, as well as the monovalent alkoxy groups derived from diols, known as "dangling diols", specifically, groups containing an alcohol and an alkoxy, such as —O—CH$_2$CH—OH), such as ethylene glycol, propylene glycol, neopentyl glycol, 1,3-propanediol, 2-methyl—1,3-propanediol, 1,3-butanediol, 2-methyl—2,4-pentanediol, 1,4-butanediol, cyclohexane dimethanol, and pinacol. In another embodiment, specific examples of X are methoxy, acetoxy and ethoxy, as well as the monovalent alkoxy groups derived from the diols, ethylene glycol, propylene glycol, neopentyl glycol, 1,3-propanediol, 2-methyl-1,3-propanediol, 1,3-butanediol, and 2-methyl-2,4-pentanediol. X may also be hydroxyacids such as glycolic acid; ester alcohols such as 2,2,4-Trimethyl-1,3-pentanediol monoisobutyrate, Texanol® available from Eastman Chemicals; and other solvents that are not classified as VOCs per European Union Directive 2004/42/EC are included.

Specific examples of Z$^b$ and Z$^c$ can be the divalent alkoxy groups derived from diols, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of Z$^b$ and Z$^c$ are the divalent alkoxy groups derived from the diols such as ethylene glycol, propylene glycol, neopentyl glycol, 1,3-propanediol, 2-methyl-1,3-propanediol, 1,3-butanediol, and 2-methyl-2,4-pentanediol are preferred. The divalent alkoxy groups derived from the diols, 1,3-propanediol, 2-methyl-1,3-propanediol, 1,3-butanediol, and 2-methyl-2,4-pentanediol. The bridging (Z$^b$) content of the cyclic and bridging organofunctional silane compositions herein must be kept sufficiently low to prevent excessive average molecular weights and crosslinking, which would lead to gelation. Z$^b$ may also be ethylenediamine, 2-aminoethanol, dicarboxylic acids such as adipic acid or malonic acid except succinic, maleic or phthalic acid, an acetylenic glycol including polyalkoxylated variants such as Surfynol® surfactants available from Air Products, or polyvinylalcohol used to make a silane ester. Z$^c$ independently may be a diol-derived alkoxy group, ethylenediamine, 2-aminoethanol, dicarboxylic acids such as adipic acid or malonic acid except succinic, maleic or phthalic acid, an acetylenic glycol including polyalkoxylated variants such as Surfynol® surfactants available from Air Products, or polyvinylalcohol used to make silane esters.

Additional embodiments are wherein v and w in Formulas 1 can be such that the ratio of w/v is between 1 and 9; X is RO—, RC(=O)O—; Z$^b$ and Z$^c$ can be derived from the diols, 1,3-propanediol, 2-methyl-1,3-propanediol, 1,3-butanediol, 2-methyl-2,4-pentanediol; R is alkyls of C$_1$ to C$_4$ and H; and G is a divalent straight chain alkyl of 2 to 18 carbon atoms. Other embodiments include those wherein w/v is between 2 and 8; X is ethoxy or one or more of the dangling diols derived from the diols, 1,3-propanediol, 2-methyl-1,3-propanediol, 1,3-butanediol, and 2-methyl-2,4-pentanediol; and G is a C$_2$-C$_{12}$ straight-chain alkyl derivative. Another embodiment are wherein v in Formula 1 is 0; X is RO—, RC(=O)O—; R is alkyls of C$_1$ to C$_4$ and H; and G is a divalent straight chain alkyl of 2 to 18 carbon atoms.

Representative examples of the cyclic and bridging organofunctional silanes described in the present invention include 2-(2-methyl-2,4 pentanedialkoxyethoxysilyl)-1-propyl amine;

2-(2-methyl-2,4-pentanedialkoxyisopropoxysilyl)-1-propyl mercaptan;

2-(2-methyl-2,4-pentanedialkoxymethylsilyl)-1-propyl chloride;

2-(2-methyl-2,4-pentanedialkoxyphenylsilyl)-1-propyl bromide;

3-(1,3-butanedialkoxyethoxysilyl)-1-propyl iodide;

3-(1,3-butanedialkoxyisopropoxysilyl)-1-propyl chloride;

N-[3-(1,3-propanedialkoxyethoxysilyl)-1-propyl]phenylamine;

N-[3-(1,3-propanedialkoxyisopropoxysilyl)-1-propyl]methylamine;

3-(1,2-propanedialkoxyethoxysilyl)-1-propyl glycidyl ether and 3-(1,2-propanedialkoxyisopropoxysilyl)-1-propyl methacrylate, both derivable from propylene glycol; 3-(1,2-ethanedialkoxyethoxysilyl)-1-propyl acrylate and 3-(1,2-ethanedialkoxyisopropoxysilyl)-1-propyl acetate, both derivable from ethylene glycol; 3-(neopentyl glycoxyethoxysilyl)-1-propyl amine and 3-(neopentyl glycoxyisopropoxysilyl)-1-propyl glycidyl ether, both derivable from neopentyl glycol; 3-(2,3-dimethyl-2,3-butanedialkoxyethoxysilyl)-1-propyl acrylate and 3-(2,3-dimethyl-2,3-butanedialkoxyisopropoxysilyl)-1-propyl methacrylate, both derivable from pinacol; 3-(2,2-diethyl-1,3-propanedialkoxyethoxysilyl)-1-propyl mercaptan; S-[3-(2,2-diethyl-1,propanedialkoxyisopropoxysilyl)-1-propyl]ethylthioether;

bis[3-(2-methyl-1,3-propanedialkoxyethoxysilyl)-1-propyl] disulfide;

bis[3-(2-methyl-1,3-propanedialkoxyisopropoxysilyl)-1-propyl] trisulfide;

bis[3-(1,3-butanedialkoxymethylsilyl)-1-propyl] tetrasulfide;

bis[3-(1,3-propanedialkoxymethylsilyl)-1-propyl] thioether;

3-(1,3-propanedialkoxyphenylsilyl)-1-propyl glycidyl thioether;

tris-N,N',N"-[3-(1,2-propanedialkoxymethylsilyl)-1-propyl] melamine and tris-N,N',N"-[3-(1,2-propanedialkoxyphenylsilyl)-1-propyl] melamine, both derivable from propylene glycol; 3-(1,2-ethanedialkoxymethylsilyl)-1-propyl chloride and 3-(1,2-ethanedialkoxyphenylsilyl)-1-propyl bromide, both derivable from ethylene glycol; 3-(neopentyl glycoxymethylsilyl)-1-propyl acetate and 3-(neopentyl glycoxyphenylsilyl)-1-propyl octanoate, both derivable from neopentyl glycol;

3-(2,3-dimethyl-2,3-butanedialkoxymethylsilyl)-1-propyl amine and 3-(2,3-dimethyl-2,3-butanedialkoxyphenylsilyl)-1-propyl amine, both derivable from pinacol; 3-(2,2-diethyl-1,3-propanedialkoxymethylsilyl)-1-propyl acrylate;

3-(2,2-diethyl-1,3-propanedialkoxyphenylsilyl)-1-propyl methacrylate;

3-(2-methyl-1,3-propanedialkoxyethylsilyl)-1-propyl glycidyl ether;

3-(2-methyl-1,3-propanedialkoxyphenylsilyl)-1-propyl acetate;

2-(2-methyl-2,4-pentanedialkoxyethoxysilyl)-1-ethyl acrylate;

2-(2-methyl-2,4-pentanedialkoxymethoxysilyl)-1-ethyl bromide;

2-(2-methyl-2,4-pentanedialkoxy methylsilyl)-1-ethyl benzenesulfonate;

2-methyl-2,4-pentanedialkoxyethoxysilylmethyl methacrylate;

2-methyl-2,4-pentanedialkoxyisopropoxysilylmethyl bromide;

neopentylglycoxypropoxysilylmethyl amine; propyleneglycoxymethylsilylmethyl mercaptan; neopentylglycoxyethylsilylmethyl glycidyl ether;

2-(neopentylglycoxyisopropoxysilyl)-1-ethyl butyrate;

2-(neopentylglycoxy methylsilyl)-1-ethyl propionate;

2-(1,3-butanedialkoxymethylsilyl)-1-ethyl acrylate;

3-(1,3-butanedialkoxyisopropoxysilyl)-4-butyl methacrylate;

3-(1,3-butanedialkoxyethylsilyl)-1-propyl mercaptan;

3-(1,3-butanedialkoxymethylsilyl)-1-propyl methanesulfonate;

6-(2-methyl-2,4-pentanedialkoxyethoxysilyl)-1-hexyl amine;

1-(2-methyl-2,4-pentanedialkoxyethoxysilyl)-5-hexyl acrylat;

8-(2-methyl-2,4-pentanedialkoxyethoxysilyl)-1-octyl methacrylate;

10-(2-methyl-2,4-pentanedialkoxyethoxysilyl)-1-decyl glycidyl ether;

3-(2-methyl-2,4-pentanedialkoxyethoxysilyl)-1-propyl trifluoromethanesulfonate;

3-(2-methyl-2,4-pentanedialkoxypropoxysilyl)-1-propyl amine;

N-[3-(2-methyl-2,4-pentanedialkoxyisopropoxysilyl)-1-propyl] ethylene diamine;

tris-N,N',N"-[3-(2-methyl-2,4-pentanedialkoxybutoxysilyl)-1-propyl] diethylene triamine;

tetrakis-N,N',N",N"'-[3-(2-methyl-2,4-pentanedialkoxyisopropoxysilyl)-1-propyl]triethylene tetramine;

bis-(3-(2-methyl-2,4-pentanedialkoxyethoxysilyl)-1-propyl) sulfide;

6-(1,3-butanedialkoxyethoxysilyl)-1-hexyl amine;

1-(1,3-butanedialkoxyethoxysilyl)-5-hexyl glycidyl ether;

8-(1,3-butanedialkoxyethoxysilyl)-1-octyl acrylate;

10-(1,3-butanedialkoxyethoxysilyl)-1-decyl methacrylate;

bis-(3-(2-methyl-2,4-pentanedialkoxyethoxysilyl)-1-propyl) thioether;

ethylenediamine;

2-amino ethanol;

adipic acid;

malonic acid; and polyvinylalcohol.

In another embodiment, the cyclic dialkoxy organofunctional silanes are cyclic and bridging analogs to the 3-chloro-1-propyltriethoxysilane (3-triethoxysilyl-1-propyl chloride), used as a starting point for the manufacture of silane coupling agents as, for example, polysulfide silanes, such as triethoxysilylpropyl tetrasulfide referred to herein as TESPT, triethoxysilylpropyl disulfide referred to herein as TESPD. The cyclic and bridging haloalkyl silanes are novel and excellent alternatives to 3-triethoxysilyl-1-propyl chloride for use where reduced VOC emissions are desired.

The cyclic and bridging organofunctional silane compositions included herein may comprise single components or various mixtures of individual cyclic and bridging organofunctional silane components, organofunctional silane components, which contain only monofunctional alkoxy groups, and optionally including other species as well. Synthetic methods result in a distribution of various silanes, wherein mixtures of the starting components are employed for the purpose of generating mixtures of cyclic and bridging organofunctional silane products. Moreover, it is understood that the partial hydrolyzates and/or condensates of these cyclic and bridging organofunctional silanes, also referred to as cyclic and bridging organofunctional siloxanes and/or silanols, may be encompassed by the silanes herein as a side product of most methods of manufacture of the cyclic and bridging organofunctional silanes. Also, the partial hydrolyzates and/or condensates can occur upon storage of the cyclic and bridging organofunctional silanes, especially in humid conditions, or under conditions in which residual water remaining from their preparation is not completely removed subsequent to their preparation. Furthermore, partial to substantial hydrolysis of the cyclic and bridging organofunctional silanes may be deliberately prepared by incorporating the appropriate stoichiometry or excess of water into the methods of preparation described herein for the silanes. Also, the siloxane content of the cyclic and bridging organofunctional silanes may be deliberately prepared by incorporating the appropriate stoichiometry or excess of water into the methods of preparation for the silanes described herein. Silane structures herein encompassing hydrolyzates and siloxanes are described in the structures given in Formula 1 wherein the subscrips, V, of $Z^b=(-O-)_{0.5}$ and/or u, of X=OH can be substantive, meaning substantially larger than zero.

The cyclic and bridging organofunctional silane compositions, if liquid, may be loaded on a carrier or a mixture of more than one carrier, such as a porous polymer, carbon black, or an inorganic filler, such as silica, alumina, various clays, etc. By loading the composition on a carrier it is in solid form for delivery to the rubber formulation. In another embodiment, the carrier would be part of the filler, either intimately absorbed onto or within, or chemically bound to the filler.

The silane compounds with heterocyclic silicon groups included herein may be prepared by transesterification of organofunctional alkoxy-substituted silanes and diols with or without a catalyst, by the esterification of organofunctional silyl halides with diols, or by the hydrosilylation of substituted alkenes with a hydrosilane containing a heterocylic silicon group to generate cyclic and bridging silane compositions.

The transesterification of organofunctional alkoxy-substituted silanes and diols may be conducted with or without a catalyst. The catalyst may be an acid, a base or a transition metal catalyst. Suitable acid catalysts are hydrochloric acid, p-toluenesulfonic acid and the like. Typical base catalysts are sodium methoxide, sodium ethoxide. Suitable transition metal catalysts are tetraisopropyl titanate, dibutyltin dilaurate.

During esterification of organofunctional silyl halides with diols, diols are added to the silyl halide with removal of the hydrogen halide formed. The hydrogen halide may be removed by sparging with nitrogen or by using reduced pressure. Any remaining halo groups can be removed by the addition of an alcohol such as methanol, ethanol, isopropanol, and the like.

In another embodiment of the present invention, the diol-derived organofunctional silane can be prepared by reacting a catalyzed mixture of organofunctional silane reactant and diol with simultaneous distillation. The reaction leads to the alcohol exchange of one or more of the alkoxy groups selectively at the silicon atom of the organofunctional silane reactant with the diol. The reaction is driven by the removal of the more volatile by-product alcohol by distillation. Suitable catalysts include acids such as p-toluenesulfonic acid, sulfuric acid, hydrochloric acid, chlorosilanes, chloroacetic acids, phosphoric acid, their mixtures, and so forth; bases such as sodium ethoxide; and, transition metal-containing catalyts such as titanium alkoxides, titanium-containing chelates, zirconium alkoxides, zirconium-containing chelates and mixtures thereof.

In yet another embodiment of the present invention, the diol-derived organofunctional silane can be prepared by catalyzing a mixture of organofunctional silane and diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10° C. to about 150° C. and in another embodiment from about 30° C. to 90° C. while maintaining a pressure in the range of from about 0.1 to about 2000 mm Hg absolute, and in another embodiment, from about 1 to about 80 mm Hg absolute. Excess diol can be utilized to increase reaction rate.

In another embodiment the diol-derived organofunctional silane can be prepared by slowly adding diol to organofunctional silane in the presence of catalyst at the desired reaction temperature and under vacuum. If desired, a neutralization step may be utilized to neutralize any acid or base catalyst that may have been utilized thereby improving product storage.

Optionally, an inert solvent may be used in the process. The solvent may serve as a diluent, carrier, stabilizer, refluxing aid or heating agent. Generally, any inert solvent, i.e., one which does not enter into the reaction or adversely affect the reaction, may be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride, and so forth.

In another embodiment of the present invention, the diol-derived organofunctional silane can be prepared by continuously premixing the flow-streams of organofunctional silane reactant, diol, and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising organofunctional silane, e.g., a thiocarboxylate silane, diol and catalyst to provide diol-derived organofunctional silane and by-product alcohol;

b) vaporizing the by-product alcohol from the thin film to drive the reaction;

c) recovering the diol-derived organofunctional silane reaction product;

d) optionally, recovering the by-product alcohol by condensation; and, e) optionally, neutralizing the diol-derived organofunctional silane product to improve its storage stability.

The molar ratio of diol to organofunctional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to organofunctional silane can be varied within a range of from about 95 to about 125 percent of stoichiometric equivalence for each alkoxy-silyl group to be transesterified. In a particular embodiment, the molar ratio of diol to organofunctional silane can be within the range of from about 100 to about 110 percent of stoichiometric equivalence. In another embodiment, the molar ratio can be within a range of from about 100 to about 105 percent of stoichiometric equivalence for the molar ratio of diol to organofunctional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the diol-derived organofunctional silane of this invention. Optimal temperatures and pressures (vacuum) for running the thin film process will depend upon the specific starting organofunctional silane's alkoxy groups and diol used in the process. Additionally, if an optional inert solvent is used in the process, that choice will affect the optimal temperatures and pressures (vacuum) utilized.

Mixtures of these silanes described above herein may be employed in the practice of this invention in so as not to venture from the spirit and scope of the invention. Advantages of the silane of this invention is that they react in a similar fashion to the silane heretofore used in coating compositions but without the production of any significant amount of VOCs. Further, the silane employed in the coating compositions of the invention reduce the need for recovery and remediation equipment and use of special engineering controls to meet new, stricter emission limits as well as mitigate explosion, flammability, and health hazards. Accordingly, use of the silanes of the present invention in manufacturing reduce the cost associated with reducing the presence and emissions of VOCs. For silanes made from hydroxy and/or aminofunctional surfactants or coalescing agents the hydrolysis of the silane during conditions of use releases a compound (other than the silane) that performs a function in the coating system (such as wetting, flow and leveling, and gloss improvement as examples for surfactants and improved film formation (film integrity, scrub resistance) as an example for a coalescing agent in addition to the desired reduction in VOC versus conventional alkoxysilanes. In some cases the diol, dicarboxylic acid, alkanoamine or other compound formed from the hydrolysis of the silane may be captured by reaction with other components of the coating system.

The adhesive-promoting or crosslinking-promoting silane can be present in the range of from about 0.1 to about 30 weight percent of the coating composition, in a second embodiment in the range of from about 0.1 to about 10 weight percent of the coating composition.

According to another embodiment of the present invention, a second silane can be added to the composition to modify other properties of the coating composition, such as adhesion to a substrate, hardness or flexibility.

An emulsifier, or surfactant, can be employed in the coating composition of the present invention. The emulsifiers, or surfactants, for use herein include nonionic, anionic, cationic, and amphoteric surfactants or mixtures thereof.

Examples of the nonionic surfactants include polymers of alkylene oxides including ethylene oxide, polyoxyethylene alkyl ethers, polyoxyethylene alkyl phenyl ethers, polyoxyethylene fatty acid esters, sorbitan fatty acid esters, polyoxyethylene sorbitan fatty acid esters.

More specifically, the nonionic surfactants may include glycerol monostearate, glycerol monooleate, sorbitan monolaurate, sorbitan monopalmitate, sorbitan monostearate, sorbitan tristearate, sorbitan monooleate, sorbitan trioleate, sorbitan monosesquioleate, polyoxyethylenesorbitan tristearate, polyoxyethylenesorbitan monooleate, polyoxyethylenesorbitan trioleate, polyoxyethylenesorbitol tetraoleate, polyoxyethylenelauryl ether, polyoxyethyleneoleyl ether, polyoxyethylene higher alcohol ether, polyoxyethyleneoctylphenyl ether, polyoxyethylenephenyl ether, and so forth.

Fluorine or silicone nonionic emulsifiers can also be utilized in the present invention including polyoxyalkylene-modified polydimethylsiloxane, fluorinated alkyl-containing polyalkyleneoxides, and so forth, although such emulsifiers are not preferred as they may have deleterious effects on the final product, especially emulsions utilized as coatings.

The anionic surfactants useful herein include fatty acid salts, alkyl sulfate ester salts, alkyl benzene sulfonate, alkyl phosphate, alkylallyl sulfate ester salt, and polyoxyethylene alkylphosphate ester.

Specifically, anionic surfactants include sodium lauryl sulfate, triethanolamine lauryl sulfate, ammonium lauryl sulfate, sodium dodecylbenzene sulfonate, sodium alkylnaphthalene sulfonate, sodium dialkylsulfosuccinate, sodium alkyldiphenylether disulfonate, diethanolamine alkylphosphate, potassium alkylphosphate, sodium polyoxyethylenelaurylether sulfate, sodium polyoxyethylenealkylether sulfate, triethanolamine polyoxyethylenealkylether sulfate, sodium alkane sulfonate, mixed fatty acid sodium soap, semi-hardened beef tallow fatty acid potassium soap, sodium stearate soap, potassium oleate soap, castor oil potassium soap, higher alcohol sodium sulfate, sodium salt of beta-naphthalenesulfonic acid formalin condensate, special aromatic sulfonic acid formalin condensate, special aromatic sulfonic acid formalin condensate, special aromatic sulfonic acid formalin condensate, special carboxylic acid type surface active agent, special polycarboxylic acid type high molecular weight surface active agent, and so forth.

Examples of the cationic surfactants include quaternary ammonium salts such as long chain alkyl trimethylammonium salts, long chain alkyl benzyl dimethyl ammonium salts, and di(long chain alkyl) dimethyl ammonium salts.

A further listing of surfactants useful in the present invention may be those described in 1998 McCutcheon's Vol. 1: Emulsifiers and Detergents, North American Edition (The Manufacturing Confectioner Publishing Co., Glen Rock) 1998, which is incorporated herein by reference.

The emulsifiers can be soluble or insoluble with the silane described above.

The appropriate HLB (hydrophilic-lipophilic balance) of the surfactants is chosen to correspond to the HLB of the specific silane being emulsified. The method for selecting the optimum HLB for a substance is well known to one skilled in the art and described in "The HLB System" published by ICI Americas Inc., in Wilmington, Del. The HLB classification of surfactants is based on molecular structure and can therefore be used to predict behavior of single molecules. According to an embodiment of the present invention, the emulsifier has an HLB of less than about 4 to about 17.

Optionally, a catalyst can be employed in the compositions of the present invention. Although a catalyst is not necessary in coating compositions, depending on the activity of silane such a catalyst which is hydrolytically stable may sometimes be beneficially employed in the coating formulation so long as said catalyst(s) does not destabilize the composition to a point where the shelf-life is impractically short. Suitable catalysts which can be employed if desired include emulsified organotin, water soluble tertiary amine, imidazole and the like. Examples of such catalysts are organotitanate, organotin, chelated titanium, aluminum and zirconium compounds, and combinations thereof. Examples of chelated titanates are dihydroxy bis[2-hydroxypropanato (2-)—$O^1,O^2$)(2-)titanate, mixed titanium ortho ester complexes, TYZOR® 101, TYZOR® GBA (acetylacetonate chelate), bis(ethyl-3-oxobutanolato $O^1$, $O^3$)bis(2-propanolato)titanium, TYZOR® CLA, isopropoxy(triethanolaminato)titanium and alkanolamine complex of titanium, with TYZOR® 131, LA, and 101, all commercially available from E. I. DuPont de Nemours and Co., Wilmington, Del. Examples of organotin catalysts are FOMREZ® UL-1, UL-22, and UL-32 available from Witco Corp., Greenwich, Conn., and dibutyltin bis(1-thioglycerol). According to another exemplary embodiment, the catalyst can be used in an amount of about 0.05 to about 5 percent of the coating composition.

Wetting agent(s) and/or film former(s) (for instance, water dispersible or latex polymers) may also be utilized in the coating formulation in amounts effective to enhance even wetting of entire area of the substrate to which the coating is applied.

Antibacterial compounds or biocides can be added to the compositions to improve their resistance to fungi growth. One of skill in the art is familiar with the biocidal agents which may be utilized, but included in this group are diazolidinyl urea, methyl paraben, ethyl paraben, propyl paraben, butyl paraben, 2-bromo-2-nitro-propane-1,3-diol, etc., and combinations thereof. A further listing of biocidal agents useful in the present invention may be those described in 1998 McCutcheon's Vol. 2; Functional Materials. According to another exemplary embodiment of the present invention, such additives are typically useful from about 0.1 to about 5% by weight based on the composition.

According to another exemplary embodiment of the present invention, a coating composition of the present invention can contain crosslinking agents for the sealant, adhesive or coating system with which the coating is employed. Such crosslinking agents may include urea and melamine resins which are methylolated and/or alkoxylated, epoxy resins, aziridines and carbodiimides. According to another exemplary embodiment, such agents can be present at about 0.1 to about 20 weight percent of the total composition, as long as they do not destabilize the composition during storage.

According to another exemplary embodiment of the present invention, the pH of the total composition may impact upon its hydrostability. High alkalinity or high acidity of the composition catalyzes the hydrolysis and condensation of the hydrolyzable sites of the silane. The closer the pH of the composition is to neutral, the better the stability of the coating. Therefore, the range of pH of the total composition is about 5.5 to about 8.5. Substances which may be used to adjust the pH are organic or inorganic buffers including sodium acetate, sodium citrate, sodium carbonate, sodium bicarbonate, sodium hydrogen phosphate, sodium dihydrogen phosphate, and the corresponding potassium salts.

Other optional ingredients for inclusion herein are fragrances, pigments, dispersed fillers such as carbon black, thixotropes, plasticizers, coalescing agents, UV inhibitors, anti-oxidants and with resins which act as moisture barriers as needed, dyes, thickeners, foaming agents, and anti-foaming agents fillers, as are commonly known and used in the art. Such components may be employed in conventional amounts.

It is recommended that an aqueous coating be applied at a temperature above 0° C. It can be dried at high temperatures or at a room temperature before application of non-waterborne sealants and adhesives. For waterborne applications, the drying step may be eliminated. Latex sealants or adhesives can be directly applied onto the wet coating composition of the present invention, and allowed them to cure at the same time.

According to another exemplary embodiment of the present invention, the coatings of the present invention are useful as hydrophobizers, crosslinkers, dispersing aids, adhesion promoters, surface modifiers, coatings, coupling agents, and so forth. Coupling agents are used in many applications including foundry resins, filled components, mineral treatments, paints, pigment dispersants, and so forth.

For mixables, the coating may be incorporated into such things as cement or concrete prior to casting and setting.

In accordance with another embodiment of the present invention, an emulsion is provided comprising water, an emulsifier, and adhesive promoter derived from a silane which, upon hydrolysis, of its hydrolyzable sites, produces a reduced amount of volatile organic compound compared to that produced by the hydrolysis of a silane possessing an equivalent number of hydrolyzable sites all of which are hydrolyzable alkoxy groups.

Optionally, a small amount of organic solvent can be used as an additional stabilizer. These organic solvents have a synergistic affect on the emulsion and are not intended to be added at the level of a solvent, but act rather as a stabilizer of the emulsion. Said solvents may be added at less than about 10.0 weight percent of the emulsion. According to another exemplary embodiment of the present invention, said solvents are added at about 1 to about 2 weight percent. According to yet another exemplary embodiment, examples of solvents useful in the present invention include, but are not limited to, alcohols such as methanol, ethanol, propanol, 2-propanol, butanol, 2-methyl-2-propanol, 2-butanol and pentanol.

The emulsions may be utilized on wood and wood products including particle board and mineral board as used in new construction.

In accordance with a yet another embodiment of the present invention, a process is provided which comprises applying an adhesion promoting primer composition to a substrate surface, subsequently applying a curable sealant, adhesive or coating formulation to the primed substrate, and allowing said sealant, adhesive or coating formulation to cure, wherein the primer is the aqueous emulsion described above.

In accordance with still yet another embodiment of the present invention, a two-part sealant, adhesive or coating system comprises a first adhesion promoting primer part and a second curable resin part, the two parts adapted to be sequentially applied to a substrate to effect a seal, adhesive bond or coating, wherein the primer is the aqueous emulsion described above.

In accordance with another embodiment of the present invention, a waterborne coating composition is provided which includes water, an emulsion-forming amount of at least one emulsifier, and a coating adhesion-promoting or crosslinking-promoting amount of silane of Formula 1. The silane can be post-added to a waterborne dispersion polymer or can be incorporated into the polymer during emulsion polymerization wherein Y is an appropriate reactive organofunctional group such as vinyl, acrylate or methacrylates.

It is to be understood that the coating compositions and emulsions of the present invention are also useful for any types of materials utilized in the construction and civil engineering industries where water repellency or waterproofness is desired. This include materials such as masonry and wood products, including brick, paving material, asphalt, cement, plaster, molding, roofing tile, stucco, magnesia cement, insulation including both electrical and thermal insulators, porcelain such as that used for spark plugs, stone, tile, faux stone, adobe, concrete, masonite, mineral board, particle board, gypsum, and so forth. Further, for example, in the construction of new buildings, the coatings and emulsions can be utilized on the foundation blocks, for roofing tile, flue lining, cement, conduit, gypsum board, molding, plaster, stucco, insulation, diatomaceous earth, adobe, stone, faux stone, porcelain and so forth. Furthermore, the coatings and emulsions of the present invention may be utilized on common brick, paving brick, face brick, asphalt, cement, concrete, reinforced concrete, and so forth such as used in roadways, parking lots, parking ramps, stadiums, bridges and so forth. They may be utilized in drainage systems on sewer pipes and for drain tiles.

The coatings and emulsions can be applied to a substrate by any common application methods including rolling, spraying, extruding, brushing, and so forth, or they may be incorporated into sizing, adhesive or sealant formulations.

The following nonrestrictive examples are further illustrative of the invention.

EXAMPLE 1

Example 1 illustrates the preparation of a low VOC producing silane ester (designated as Silane A) which will later be employed in the preparation of an aqueous coating composition. Silane A was prepared by the following method:

0.46 moles of MPEG-350 (CARBOWAX® MPEG-350 available from Dow Chemical Company) were charged into a 250 ml 3 neck flask equipped with a thermocouple, magnet, short path distillation head, rubber septum and gas bubbler. The polyethylene glycol material was heated to 105° C. Dried nitrogen was introduced below the surface of the solution via syringe needle. The nitrogen sparge was held at 105° C. for 60 minutes. The pot was allowed to cool. Approximately 0.23 Moles vinyltriethoxysilane (Silquest* A-151 from GE Silicones) and Purolite CT-275 (1.0 weight %) strong acid ion-exchange resin were then charged into the reaction pot. The pressure was lowered and the pot was heated to 70° C. Ethanol was formed and removed by vacuum distillation. The pot temperature was held at 70° C. under vacuum ranging from 47-130 mm Hg until all residual ethanol was removed. The acid ion exchange resin was removed by pressure filtration leaving behind a slightly viscous clear reaction product.

EXAMPLE 2; COMPARATIVE EXAMPLE 1

Example 2 describes the preparation of a mixture including Silane A (Example 1) and determination of the VOC content of Silane A. Comparative Example 1, provided as a control, describes the preparation of a mixture including a vinyl silane ester of ethanol and determination of the VOC content of the vinyl silane ester of ethanol.

The mixtures of Example 2 and Comparative Example 1 were independently prepared by mixing each of the ingredients and in the amounts indicated in Table 1. All of the ingredients were added and mixed in a disposable aluminum pan at ambient temperature.

TABLE 1

Composition of the Mixtures

| Ingredients | Example 2 | Comparative Example 1 |
| --- | --- | --- |
| Silane A (Example 1) | 0.3 grams | — |
| Vinyl Silane Ester of Ethanol | — | 0.3 grams |
| 2-propanol | 1.0 ml | 1.0 ml |
| Distilled Water | 1.0 ml | 1.0 ml |
| Glacial Acetic Acid | 1 Drop | 1 Drop |

The VOC content of each silane, Silane A and vinyl silane ester of ethanol, was determined by the following method: Each of the pans containing the silanes was placed in a fume-hood overnight. The pans were then placed into a convection oven set at 110° C. for 1 hour. The pans were removed from the convection oven and cooled to ambient temperature. The measured residual and VOC content of the silanes were then determined and are listed in Table 2 below.

TABLE 2

VOC content

| Example | Residual Weight (percent) | VOC content (percent) |
| --- | --- | --- |
| 2 | 93.9 | 6.1 |
| Comparative Example 1 | 38.3 | 61.7 |

EXAMPLES 3-4

Example 3 describes the preparation of an aqueous coating including Silane A (Example 1) which will later be applied to an aluminum panel. Example 3 was prepared by the following method: 1 gram of Silane A was mixed with 1 ml of distilled water in a 30 ml glass vial. A drop of glacial acetic acid and 0.055 g of Triton X-100 surfactant was then added to the resulting mixture. The mixture was swirled in the vial to give a slightly hazy solution. Under continuous mixing, eighteen grams of water was added to give a 5% solution of the silane in water. The measured pH of the solution was. 4.04.

Example 4 describes the coating of an aluminum panel with the aqueous coating of Example 3. A 0.025 inch×4 inch×12 inch 3105 H24 aluminum alloy panel was cleaned in an aqueous alkaline solution by immersion for one minute in the stirred solution at 65° C. The composition of the cleaning solution was 0.06 wt. % Triton X-100 surfactant, 0.52 wt. % sodium metasilicate (anhydrous), 0.49 wt. % sodium carbonate (anhydrous) and 0.35 wt. % sodium phospate, dibasic (anhydrous) with the balance being water. The aluminum panel was removed from the cleaning solution, immediately rinsed with a stream of deionized water and then dried with a stream of dry nitrogen gas. The coating of Example 3 was then applied to the aluminum panel by flow coating where a stream of liquid was applied from a disposable plastic pipet to form a continuous wet film on the panel surface. The panel was allowed to drain and dry in the vertical position while in a fume hood. The coating dried within 10 minutes. The coated area was uniformly altered in appearance with a lower reflectivity than the untreated areas of the aluminum panel.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A coating composition which comprises an adhesion-promoting amount or crosslinking effective amount of a silane which, upon hydrolysis of its hydrolyzable sites, produces an organic compound selected from the group consisting of acetylenic glycols, polyalkoxylated variants of acetylenic glycols, hydroxycarboxylic acids and ester alcohols wherein the silane has the general formula:

$$Y[-G(-SiX_vZ^c_w)_s]_r \quad \text{(Formula 1)}$$

wherein each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms;

each occurrence of X is independently selected from the group consisting of a monovalent alkoxy group derived from acetylenic glycols, polyalkoxylated variants of acetylenic glycols, hydroxycarboxylic acid and ester alcohols;

each occurrence of $Z^C$ is independently selected from the group consisting of $-O(R^{10}CR^{11})_tO-$, $-NR^4-L^1-NR^5-$, and $-OC(=O)R^{10}CR^{11}C(=O)O-$, wherein each occurrence of $R^{10}$ and $R^{11}$ is independently R and each occurrence of $L^1$ is independently G;

each occurrence of R is chosen independently from the set of groups consisting of hydrogen, and organic groups having 1 to about 20 carbon atoms and selected from straight alkyl, cyclic alkyl, branched alkyl, alkenyl, aryl, aralkyl, an ether, a polyether and molecular components obtained by removal of one or more hydrogen atoms of a heterocarbon;

each occurrence of $R^4$ and $R^5$ is independently given by one of the structures listed for R each occurrence of the subscript f is an integer from 1 to about 15;

each occurrence of the subscript u is an integer equal to 1;

each occurrence of the subscript w is an integer equal to 1;

each occurrence of the subscript r is an integer from 1 to about 6;

each occurrence of the subscript s is an integer from 1 to about 6; and, each occurrence of Y is a functional group of valence r.

2. The composition of claim 1 wherein Y is selected from the group consisting of a univalent functional group, a divalent functional group, a trivalent functional group, a tetravalent functional group and a polyvalent functional group.

3. The composition of claim 2 wherein the univalent functional group is selected from the group consisting of $CH_2=CH-$, $CHR=CH-$, $CR_2=CH-$, mercapto, acryloxy, methacryloxy, acetoxy, $-O-CH_2-C_2H_3O$, $-CH_2-CH_2-C_6H_9O$, $-C_6H_9O$, $-CR^6(-O-)CR^4R^5$, $-OH$, $-NR^4C(=O)OR^5$, $-OC(=O)NR^4R^5$, $-NR^4C(=O)SR^5$, $-SC(=O)NR^4R^5$, $-NR^4C(=S)OR^5$, $-OC(=S)NR^4R^5$, $-NR^4C(=S)SR^5$, $-SC(=S)NR^4R^5$, maleimide, maleate, substituted maleate, fumarate, substituted fumarate, $-CN$, citraconimide, , $-OCN$, $-N=C=O$, $-SCN$, $-N=C=S$, $-OR^4$, $-F$, $-Cl$, $-Br$; $-I$, $-SR^4$, $-S-SR^4$, $-S-S-SR^4$, $-S-S-S-SR^4$, $-S-S-S-S-SR^4$, $-S-S-S-S-SR^4$, $-S_xR^4$, $-SC(=S)OR^4$, $-SC(=S)SR^4$, $-SC(=O)SR^4$, $-NR^4C(=O)NR^5R^6$, $-NR^4C(=S)NR^5R^6$, $R^4C(=O)NR^5-$, $-C(=O)NR^4R^5-$, $R^4C(=S)NR^4-$, melamine, cyanurato, $-NH_2$, $-NHR^4$, $-NR^4R^5$, $-NR^4-L^1-NR^5R^6$, $-NR^4-L^1(-NR^5R^6)_2$, $-NR^4-L^1-NR^5-L^2-NR^6R^7$, $-NR^4-L^1(-NR^5R^6)_3$, $-NR^4-L^1-NR^5-L^2-NR^6-L^3-NR^7R^8$ and $-NR^4-L^1-N(-L^2NR^5R^6)_2$;

the divalent functional group is selected from the group consisting of $-(-)C(-O-)CR^4R^5$, $-CR^5(-O-)CR^4-$, $-O(R^{10}CR^{11})_fO-$, $-(-)NC(=O)OR^5$, $-OC(=O)NR^4-$, $-(-)NC(=O)SR^5$, $-SC(=O)NR^4-$, $-(-)NC(=S)OR^5$, $-OC(=S)NR^4-$, $-(-)NC(=S)SR^5$, $-SC(=S)NR^4-$, $-O-$, maleate, substituted maleate, fumarate, substituted fumarate, $-S-$, $-S-S-$, $-S-S-S-$, $-S-S-S-S-$, $-S-S-S-S-S-$, $-S-S-S-S-S-S-$, $-S_x-$, $-SC(=S)O-$, $-SC(=S)S-$, $-SC(=O)S-$, $-(-)NC(=O)NR^4R^5$, $-NR^4C(=O)NR^5-$, $-(-)NC(=S)NR^4R^5$, $-NR^4C(=S)NR^5-$, $R^4C(=O)N(-)-$, $-C(=O)NR^4-$, $R^4C(=S)N(-)-$, divalent melamine, divalent cyanurato, $-NH-$, $-NR^4-$, $-(-)N-L^1-NR^4R^5$, $-NR^4-L^1-NR^5-$, $(-)NR^4)_2-L^1-NR^5R^6$, $-(-)N-L^1-NR^5-L^2-NR^6R^7$, $-NR^4-L^1-N(-)-L^2-NR^5R^6$, $-NR^4-L^1-NR^5-L^2-NR^6-$, $-(-)N-L^1-(NR^5R^6)_3$, $(-NR^4)_2-L^1-(NR^5R^6)_2$, $-(-)N-L^1-NR^4-L^2-NR^5-L^3-NR^6R^7$, $-NR^4-L^1-N(-)-L^2-NR^5-L^3-NR^6R^7$, $-NR^4-L^1-NR^5-L^2-N(-)-L^3-NR^6R^7$, $-NR^4-L^1-NR^5-L^2-NR^6-L^3-NR^7-$, $-(-)N-L^1-N(-L^2NR^5R^6)_2$ and $(-NR^4L^1-)_2N-L^2NR^5R^6$;

the trivalent functional group is selected from the group consisting of $-(-)C(-O-)CR^4-$, $-(-)NC(=O)O-$, $-(-)NC(=O)S-$, $-(-)NC(=S)O-$, $-(-)NC(=S)S-$, $-(-)NC(=O)NR^4-$, $-(-)NC(=S)NR^4-$, $-C(=O)N(-)-$, $-C(=S)N(-)-$, trivalent melamino; trivalent cyanurato, $-N(-)-$, $-(-)N-L^1-NR^4-$, $(-NR^4)_3-L^1$, $(-NR^4)_2-L^1-NR^5-$, $-(-)N-L^1-N(-)-L^2-NR^3R^4$, $-NR^4-L^1-N(-)-L^2-NR^5-$, $-(-)N-L^1-NR^4-L^2-NR^5-$, $-(-)N-L^1-N(-)-L^2-NR^5-L^3-NR^3R^4$, $-NR^4-L^1-N(-)-L^2-N(-)-L^3-NR^3R^4$, $-(-)N-L^1-NR^5-L^2-N(-)-L^3-NR^3R^4$, $-NR^4-L^1-N(-)-L^2-NR^3-L^3-NR^4-$, $-(-)N-L^1-N(-L^2NR^3R^4)(-L^2NR^5-)$ and $(-NR^4L^1-)_3N$;

the tetravalent functional group is selected from the group consisting of $-(-)C(-O-)C(-)-$, $-(-)NC(=O)N(-)-$, $-(-)NC(=S)N(-)-$, tetravalent melamino, $-(-)N-L^1-N(-)-$, $(-NR^4)_4-L^1$, $(-NR^4)_2-L^1-N(-)-$, $-(-)N-L^1-N(-)-L^2NR^3-$, $-(-)N-L^1-NR^4-L^2(-)-$, $-(-)N-L^1-N(-)-L^2-N(-)-L^3-NR^4R^3$, $-NR^4-L^1-N(-)-L^2-N(-)-L^3-NR^3-$, $-(-)N-L^1-NR^4-L^2-NR^3-L^3-N(-)-$ and $-(-)N-L^1-N(-L^2NR^3-)_2$; and, the polyvalent functional group is selected from the group consisting of polyvalent hydrocarbon groups, $(-NR^3)(-N-)_2C_3N_3$, $(-N-)_3C_3N_3$, $-(-)N-L^1-N(-)-L^2-N(-)-$, $-(-)N-L^1-N(-)-L^2-N(-)-L^3-NR^3-$, $-(-)N-L^1-NR^3-L^2-N(-)-L^3-N(-)-$, $[-(-)N-L^1-]_2N-L^2NR^3-$, $-(-)N-L^1-N(-)-L^2-N(-)-L^3-N(-)-$ and $[-(-)N-L^1-]_3$, wherein each occurrence of $L^1$, $L^2$, and $L^3$ is selected independently from the set of structures given above for G, each occurrence of $R^{3-8}$ is independently given by one of the structures listed above for R and x is independently an integer from 1 to 10.

4. The composition of claim 1 wherein G is selected from the group consisting of diethylene cyclohexane, 1,2,4-triethylene cyclohexane, diethylene benzene, phenylene, $-(CH_2)_m-$ wherein m is 1 to 12 and $CH_2(CH_2)_qCH(CH_3)-$ wherein q is zero to 17.

5. The composition of claim 1 wherein R and $R^{10}$ and $R^{11}$ are independently selected from the group consisting of methyl, ethyl, propyl, isopropyl, octenyl, cyclohexyl, butyl, phenyl, benzyl, tolyl, allyl, methoxyethyl, ethoxyethyl, dimethylaminoethyl and cyanoethyl.

6. The composition of claim 1 wherein $R^{10}$ and $R^{11}$ are each independently selected from a group consisting of hydrogen, methyl and ethyl.

7. The composition of claim 1 wherein $R^4$ and $R^5$ are independently selected from the group consisting of hydrogen, methyl, ethyl and propyl.

8. The composition of claim 3 wherein $R^3$, $R^4$, $R^5$, $R^6$, $R^7$ and $R^8$ are independently selected from the group consisting of phenyl, methyl, butyl, H and ethyl.

9. The composition of claim 1 wherein X is a group derived from glycolic acid or a group derived from 2,2,4-trimethyl-1,3-propanediol monoisobutyrate.

10. The composition of claim 1 wherein $Z^c$ is selected from the group consisting of divalent alkoxy groups derived from the diols consisting of ethylene glycol, propylene glycol, neopentyl glycol, 1,3-propanediol, 2-methyl-1,3-propanediol, 1,3-butanediol, 1,4 butanediol, 2-methyl-2,4-pentanediol, cyclohexane dimethanol and pinacol.

11. The composition of claim 1 wherein $Z^c$ is a moiety derived from a diol selected from the group of diols consisting of 1,3-propanediol, 2-methyl-1,3-propanediol, 1,3-butanediol and 2-methyl-2,4-pentanediol;

R is independently selected from the group consisting of an alkyl of $C_1$ to $C_4$ and H; and, G is a divalent straight chain alkyl of 2 to 18 carbon atoms.

12. The composition of claim 1 wherein G is a $C_2$-$C_{12}$ straight-chain alkyl derivative.

13. The composition of claim 1 wherein is R is an alkyl of $C_1$ to $C_4$ or H, and G is a divalent straight chain alkyl of 2 to 18 carbon atoms.

14. The composition of claim 1 wherein the silane is present in the range of from about 0.1 to about 30 weight percent of the composition.

15. The composition of claim 14 wherein the silane is present in the range of from about 0.1 to about 10 weight percent of the composition.

16. The composition of claim 1 wherein the composition further comprises an emulsifier.

17. The composition of claim 16 wherein the emulsifier is selected from the group consisting of nonionic, anionic, cationic, amphoteric surfactants, and mixtures thereof.

18. The composition of claim 16 wherein the emulsifier has an HLB of less than about 4 to about 17.

19. The composition of claim 1 wherein the pH of the composition is in the range of from about 5.5 to about 8.5.

20. The composition of claim 1 wherein the composition further comprises a catalyst.

21. The composition of claim 20 wherein the catalyst is selected from the group consisting of organotitanate, organotin, chelated titanium, aluminum and zirconium compounds, and combinations thereof.

22. The composition of claim 20 wherein the catalyst is present in an amount of about 0.05 to about 5 percent of the coating composition.

23. The composition of claim 1 wherein the composition further comprises one or more of a wetting agent, a filler, a thixotrope, a pigment, a plasticizer, a coalescing agent, a biocide, a fungicide, a UV inhibitor, an anti-oxidant and a moisture barrier resin.

24. A silane of general Formula (1):

$$Y[\text{-}G(\text{---}SiX_uZ^c_w)_s]_r \qquad \text{(Formula 1)}$$

wherein
  each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms;
  each occurrence of X is independently selected from the group consisting of a monovalent alkoxy group derived from acetylenic glycols, polyalkoxylated variants of acetylenic glycols, hydroxycarboxylic acids and ester alcohols;
  each occurrence of $Z^c$ is independently selected from the group consisting of —O($R^{10}CR^{11}$)$_f$O—, —$NR^4$-$L^1$-$NR^5$—, and —OC(=O)$R^{10}CR^{11}$C(=O)O—, wherein each occurrence of $R^{10}$ and $R^{11}$ is independently R and each occurrence of $L^1$ is independently G;
  each occurrence of R is chosen independently from the set of groups consisting of hydrogen, and organic groups having 1 to about 20 carbon atoms and selected from straight alkyl, cyclic alkyl, branched alkyl, alkenyl, aryl, aralkyl, an ether, a polyether and molecular components obtained by removal of one or more hydrogen atoms of a heterocarbon;
  each occurrence of $R^4$ and $R^5$ is independently given by one of the structures listed for R
  each occurrence of the subscript f is an integer from 1 to about 15;
  each occurrence of the subscript u is an integer equal to 1;
  each occurrence of the subscript w is an integer equal to 1,
  each occurrence of the subscript r is an integer from 1 to about 6;
  each occurrence of the subscript s is an integer from 1 to about 6;
  each occurrence of Y is a functional group of valence r.

25. The silane of claim 24, wherein Y is a univalent functional group selected from the group consisting of $CH_2$=CH—, CHR=CH—, $CR_2$=CH—, mercapto, acryloxy, methacryloxy, acetoxy, —O—$CH_2$—$C_2H_3O$, —$CH_2$—$CH_2$—$C_6H_9O$, —$C_6H_9O$, —$CR^6$(—O—)$CR^4R^5$, —OH, —$NR^4C$(=O)$OR^5$, —OC(=O)$NR^4R^5$, —$NR^4C$(=O)$SR^5$, —SC(=O)$NR^4R^5$, —$NR^4C$(=S)$OR^5$, —OC(=S)$NR^4R^5$, —$NR^4C$(=S)$SR^5$, —SC(=S)$NR^4R^5$, maleimide, maleate, substituted maleate, fumarate, substituted fumarate, —CN, citraconimide, , —OCN, —N=C=O, —SCN, —N=C=S, —$OR^4$, —F, —Cl, —Br; —I, —$SR^4$, —S—$SR^4$, —S—S—$SR^4$, —S—S—S—$SR^4$, —S—S—S—S—$SR^4$, —S—S—S—S—S—$SR^4$, —$S_xR^4$, —SC(=S)$OR^4$, —SC(=S)$SR^4$, —SC(=O)$SR^4$, —$NR^4C$(=O)$NR^5R^6$, —$NR^4C$(=S)$NR^5R^6$, $R^4C$(=O)$NR^5$—, —C(=O)$NR^4R^5$—, $R^4C$(=S)$NR^4$—, melamine, cyanurato, —$NH_2$, —$NHR^4$, —$NR^4R^5$, —$NR^4$-$L^1$-$NR^5R^6$, —$NR^4$-$L^1$(—$NR^5R^6$)$_2$, —$NR^4$-$L^1$-$NR^5$-$L^2$-$NR^6R^7$, —$NR^4$-$L^1$(—$NR^5R^6$)$_3$, —$NR^4$-$L^1$-$NR^5$-$L^2$-$NR^6$-$L^3$-$NR^7R^8$ and —$NR^4$-$L^1$-N(-$L^2NR^5R^6$)$_2$;
  or Y is a divalent functional group selected from the group consisting of -(-)C(—O—)$CR^4R^5$, —$CR^5$(—O—)$CR^4$—, —O($R^{10}CR^{11}$)$_f$O—, -(-)NC(=O)$OR^5$, —OC(=O)$NR^4$—, -(-)NC(=O)$SR^5$, —SC(=O)$NR^4$—, -(-)NC(=S)$OR^5$, —OC(=S)$NR^4$—, -(-)NC(=S)$SR^5$, —SC(=S)$NR^4$—, —O—, maleate, substituted maleate, fumarate, substituted fumarate, —S—, —S—S—, —S—S—S—, —S—S—S—S—, —S—S—S—S—S—, —S—S—S—S—S—S—, —$S_x$—, —SC(=S)O—, —SC(=S)S—, —SC(=O)S—, -(-)NC(=O)$NR^4R^5$, —$NR^4C$(=O)$NR^5$—, -(-)NC(=S)$NR^4R^5$, —$NR^4C$(=S)$NR^5$—, $R^4C$(=O)N(-)-, —C(=O)$NR^4$—, $R^4C$(=S)N(-)-, divalent melamine, divalent cyanurato, —NH—, —$NR^4$—, -(-)N-$L^1$-$NR^4R^5$, —$NR^4$-$L^1$-$NR^5$—, (-)$NR^4$)$_2$-$L^1$-$NR^5R^6$, -(-)N-$L^1$-$NR^5$-$L^2$-$NR^6R^7$, —$NR^4$-$L^1$-N(-)-$L^2$-$NR^5R^6$, —$NR^4$-$L^1$-$NR^5$-$L^2NR^6$—, -(-)N-$L^1$-(-$NR^5R^6$)$_3$, (—$NR^4$)$_2$-$L^1$-(-$NR^5R^6$)$_2$, -(-)N-$L^1$-$NR^4$-$L^2$-$NR^5$-$L^3$-$NR^6R^7$, —$NR^4$-$L^1$-N(-)-$L^2$-$NR^5$-$L^3$-$NR^6R^7$, —$NR^4$-$L^1$-$NR^5$-$L^2$-N(-)-$L^3$-$NR^6R^7$, —$NR^4$-$L^1$-$NR^5$-$L^2$-$NR^6$-$L^3$-$NR^7$—, -(-)N-$L^1$-N(-$L^2NR^5R^6$)$_2$ and (—$NR^4L^1$-)$_2$N-$L^2NR^5R^6$;
  or Y is a trivalent functional group selected from the group consisting of -(-)C(—O—)$CR^4$—, -(-)NC(=O)O—, -(-)NC(=O)S—, -(-)NC(=S)O—, -(-)NC(=S)S—, -(-)NC(=O)$NR^4$—, -(-)NC(=S)$NR^4$—, —C(=O)N(-)-, —C(=S)N(-)-, trivalent melamino; trivalent cyanurato, —N(-)-, -(-)N-$L^1$-$NR^4$—, (—$NR^4$)$_3$-$L^1$, (—$NR^4$)$_2$-$L^1$-$NR^5$—, -(-)N-$L^1$-N(-)-$L^2$-$NR^3R^4$, —$NR^4$-$L^1$-N(-)-$L^2$-$NR^5$—, -(-)N-$L^1$-$NR^4$-$L^2$-$NR^5$—, -(-)N-$L^1$-N(-)-$L^2$-$NR^5$-$L^3$-$NR^3R^4$, —$NR^4$-$L^1$-N (-)-$L^2$-N(-)-$L^3$-$NR^3R^4$, -(-)N-$L^1$-$NR^5$-$L^2$-N(-)-$L^3$-$NR^3R^4$, —$NR^4$-$L^1$-N(-)-$L^2$-$NR^3$-$L^3$-$NR^4$—; -(-)N-$L^1$-N(-$L^2NR^3R^4$)(-$L^2NR^5$—) and (—$NR^4L^1$—)$_3$N;
  or Y is a tetravalent functional group selected from the group consisting of -(-)C (—O—)C(-)-, -(-)NC(=O)N (-)-, -(-)NC(=S)N(-)-, tetravalent melamino, -(-)N-$L^1$-N(-)-, (—$NR^4$)$_4$-$L^1$, (—$NR^4$)$_2$-$L^1$-N(-)-, -(-)N-$L^1$-N(-)-$L^2NR^3$—, -(-)N-$L^1NR^4$-$L^2$(-)-, -(-)N-$L^1$-N(-)-$L^2$-N (-)-$L^3$-$NR^4R^3$, —$NR^4$-$L^1$--N (-)-$L^2$-N(-)-$L^3$-$NR^3$—, -(-)N-$L^1$-$NR^4$-$L^2$-$NR^3$-$L^3$-N(-)- and -(-)N-$L^1$-N (-$L^2NR^3$—)$_2$; and,
  or Y is a polyvalent functional group selected from the group consisting of polyvalent hydrocarbon groups, $(-NR^3)(-N-)_2C_3N_3$, $(-N-)_3C_3N_3$, $-(-)N-L^1-N(-)-L^2-N(-)-$, $-(-)N-L^1-N(-)-L^2-N(-)-L^3-NR^3-$, $-(-)N-L^1-NR^3-L^2-N(-)-L^3-N(-)-$, $[-(-)N-L^1-]_2N-L^2NR^3-$, $-(-)N-L^1-N(-)-L^2-N(-)-L^3-N(-)-$ and $[-(-)N-L^1-]_3$, wherein each occurrence of $L^1$, $L^2$, and $L^3$ is selected independently from the set of structures given above for G, each occurrence of $R^{3-8}$ is independently given by one of the structures listed above for R and x is independently an integer from 1 to 10.

26. The silane of claim 24, wherein $R^{10}$ and $R^{11}$ are each independently selected from a group consisting of hydrogen, methyl and ethyl.

27. The silane of claim 25, wherein $R^3, R^4, R^5, R^6, R^7$ and $R^8$ are each independently selected from the group consisting of phenyl, methyl, butyl, H and ethyl.

* * * * *